United States Patent [19]
Ono et al.

[11] Patent Number: 5,539,885
[45] Date of Patent: Jul. 23, 1996

[54] DISTRIBUTED INFORMATION PROCESSING SYSTEM PROVIDING A RESUME FUNCTION AND RESUME METHOD FOR THE DISTRIBUTED INFORMATION PROCESSING SYSTEM

[75] Inventors: Katsuhiro Ono, Fujisawa; Yukio Nakata, Machida; Satoru Tezuka, Yokohama; Atsushi Kobayashi, Zama; Keiichi Nakane, Yokohama, all of Japan

[73] Assignee: Hitachi, Ltd., Tokyo, Japan

[21] Appl. No.: 114,084

[22] Filed: Aug. 31, 1993

[30] Foreign Application Priority Data

Aug. 31, 1992 [JP] Japan ................................ 4-230912

[51] Int. Cl.$^6$ ................................................ G06F 13/00
[52] U.S. Cl. .................... 395/200.03; 395/800; 364/230; 364/242.94; 364/DIG. 1
[58] Field of Search .................................. 395/800, 725, 395/575, 425, 200, 200.03, 200.05, 200.09, 200.15, 825, 835, 878, 182.09, 183.16

[56] References Cited

U.S. PATENT DOCUMENTS

| | | | |
|---|---|---|---|
| 4,949,248 | 8/1990 | Caro | 395/725 |
| 5,131,077 | 7/1992 | Indei | 395/113 |
| 5,140,689 | 8/1992 | Kobayashi | 395/575 |
| 5,276,863 | 1/1994 | Heider | 395/575 |
| 5,367,698 | 11/1994 | Webber et al. | 395/800 |

Primary Examiner—Alyssa H. Bowler
Assistant Examiner—Alpesh M. Shah
Attorney, Agent, or Firm—Antonelli, Terry, Stout & Kraus

[57] ABSTRACT

A distributed information processing system which includes a server having a resume-request processor and clients having resume-request units or processor. An user at the client site operates a resume switch to save an operation state of the client in the server's magnetic disc, and resume it from the server's magnetic disc. The operation state includes contents of the main memory, contents of the display memory, values of the I/O registers for peripheral devices, and information about the file of the server being used by the application program run by the user. The user is able to use any client of the system in the same situation including a connection state between the file and the application program as before.

52 Claims, 11 Drawing Sheets

| DRIVE NAME | SHARED FILE NAME |
|---|---|
| A: | aaa |
| B: | bbb |
| C: | ccc |

| SHARED FILE NAME | DIRECTORY/FILE NAME |
|---|---|
| aaa | /usr/a |
| bbb | /usr/b |
| ccc | /usr/c |
| ddd | /usr/d |
| eee | /tmp |

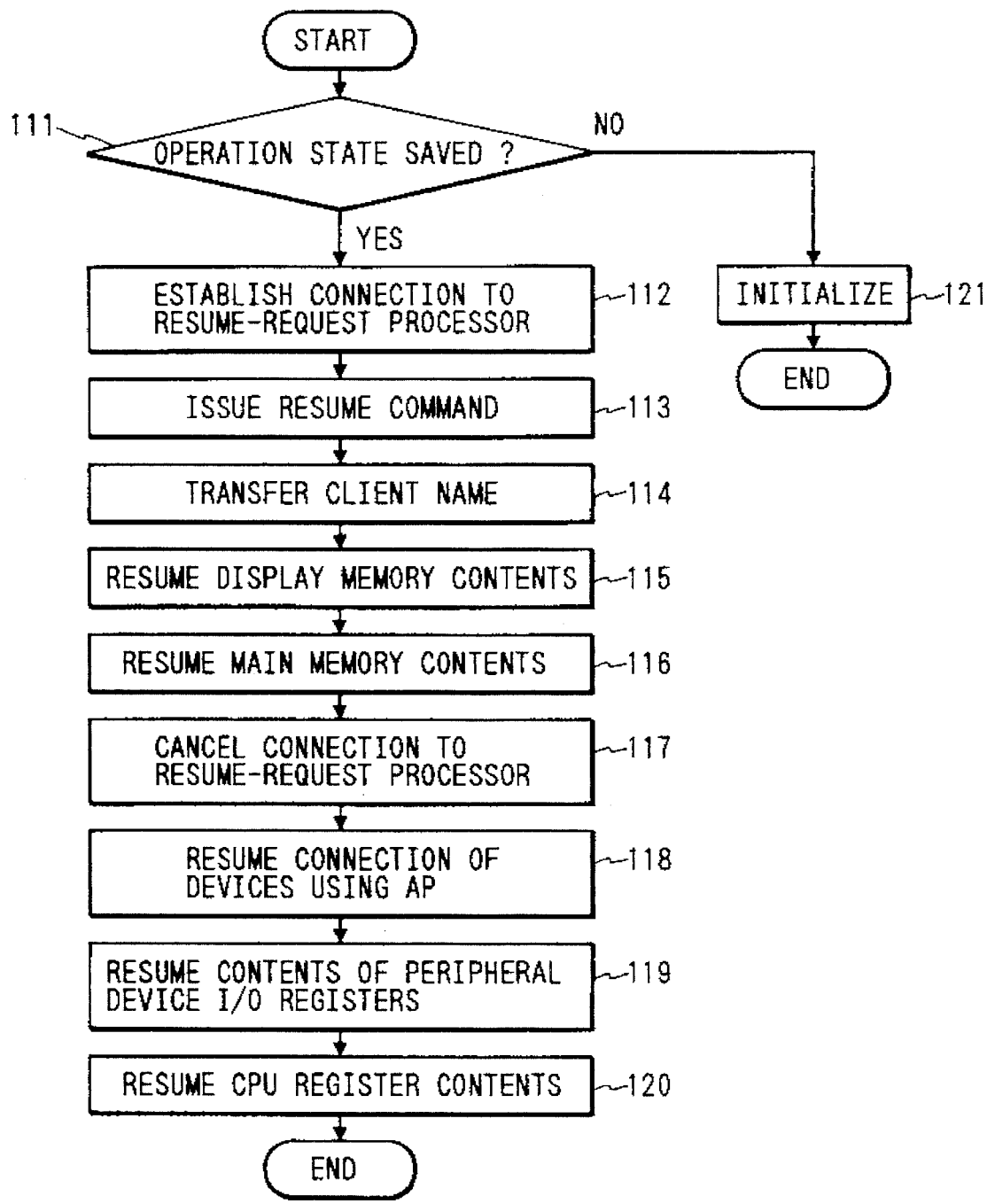

FIG. 8

| NETWORK NAME | PATH NAME | FILE IDENTIFIER |
|---|---|---|
| aaa/det | /usr/a/det | 4 |
| aaa/ghi | /usr/a/ghi | 5 |
| aaa/jkl | /usr/a/jkl | 6 |
| ddd/abc | /usr/d/abc | 7 |
| eee/abc | /tmp/abc | 8 |

FIG. 9

| NETWORK NAME | PATH NAME | FILE IDENTIFIER |
|---|---|---|
| aaa/det | /usr/a/det | 4 |
| aaa/ghi | /usr/a/ghi | 5 |
| aaa/jkl | /usr/a/jkl | 6 |
| ddd/abc | /usr/d/abc | 7 |
| eee/abc | /tmp/abc | 8 |
| aaa/abc | /usr/a/abc | 9 |

FIG. 10

| NETWORK NAME | PATH NAME |
|---|---|
| aaa/det | /usr/a/det |
| aaa/ghi | /usr/a/ghi |
| aaa/jkl | /usr/a/jkl |
| ddd/abc | /usr/d/abc |
| eee/abc | /tmp/abc |
| aaa/abc | /usr/a/abc |

FIG. 11

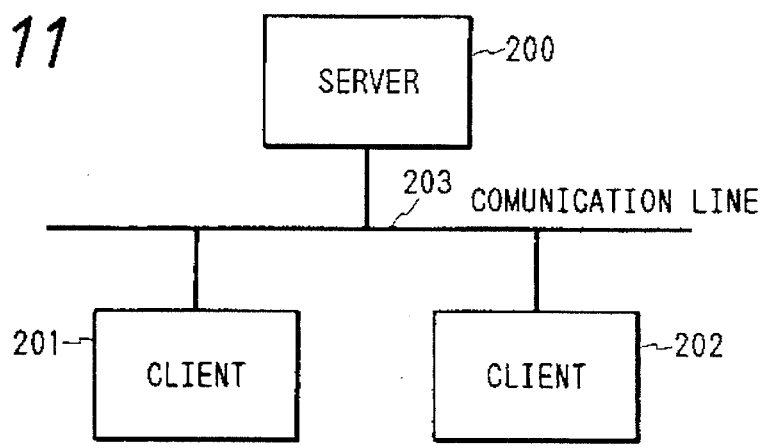

FIG. 12

| NETWORK NAME | PATH NAME | FILE IDENTIFIER | USER NAME |
|---|---|---|---|
| aaa/det | /usr/a/det | 4 | John |
| aaa/ghi | /usr/a/ghi | 5 | John |
| aaa/jkl | /usr/a/jkl | 6 | Ken |
| ddd/abc | /usr/a/abc | 7 | Lee |
| eee/abc | /tmp/abc | 8 | Mary |

FIG. 13

| NETWORK NAME | PATH NAME | FILE IDENTIFIER | USER NAME |
|---|---|---|---|
| aaa/det | /usr/a/det | 4 | John |
| aaa/ghi | /usr/a/ghi | 5 | John |
| aaa/jkl | /usr/a/jkl | 6 | Ken |
| ddd/abc | /usr/a/abc | 7 | Lee |
| eee/abc | /tmp/abc | 8 | Mary |
| aaa/abc | /usr/a/abc | 9 | John |

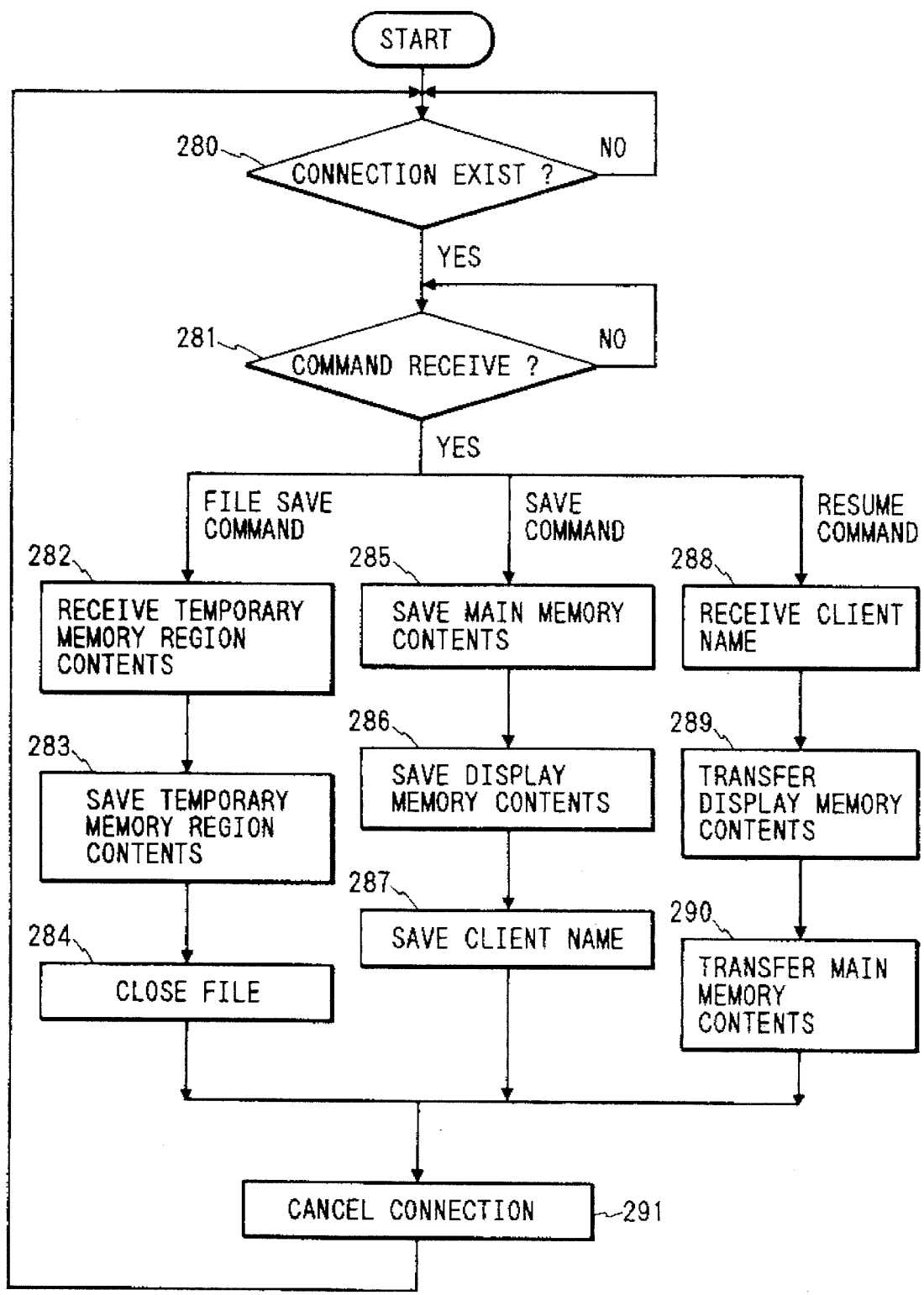

5,539,885

DISTRIBUTED INFORMATION PROCESSING SYSTEM PROVIDING A RESUME FUNCTION AND RESUME METHOD FOR THE DISTRIBUTED INFORMATION PROCESSING SYSTEM

BACKGROUND OF THE INVENTION

The present invention relates to a distributed information processing system wherein clients access files in a server with application programs for processing with graphic display by users at the clients' sites. More particularly, the invention is an arrangement in the above system For retaining and resuming operating states of clients.

A typical resuming arrangement is disclosed in Japanese Patent Laid Open No. HEI/-1-279391. This arrangement is for retaining and resuming operating states stored in a main memory, a display memory and I/O registers of peripheral devices in a single information processing device. Information about the operating states is stored in a memory of the information processing device at a specific time for example when the power is turned off, and the same operating states reappear in the information processing device by using the information in the memory when a user starts using the information processing device again. Distributed information processing systems in which the programs of clients access remotely a file of a server for processing are known. In the distributed information processing system using a network, a connection between the program and the file and an opening state of the file cannot be retained and resumed by the above arrangement. This makes it impossible for the program to use again the file even if the operating states of the inside of a client are resumed. On the other hand, in distributed information processing system, an user can use the file of the server from any client. However, the operating states of the inside of the client do not reappear if the user has moved from one client to another.

SUMMARY OF THE INVENTION

An object of the present invention is to provide an easy-to-use resuming arrangement of a distributed information processing system which can resume all states necessary to use again the file in the server.

Another object of the present invention is to provide a resuming arrangement making the most of features of the distributed information processing system In order to attain the objects, a distributed information processing system is provided which has resume request units in clients and a resume request processor in a server. The resume request unit transfers information about an operating state of the client at a specific time to the server, requests the transfer of information from the server, receives the information transferred from the server and resumes the operating state according to the information received from the server. The resume request processor receives the information from the resume request unit, saves the information received from the resume request unit, and transfers the saved information to the resume request unit corresponding to the request.

More particularly, the server retains not only the information about the operating states of the inside of the client, but information about the connection between the application programs of the client and the file used by the application program, and information about an open-file including a network name of the file, a pass name of the file and identifier of the file. The client resumes the operating states using the connection and information about the open-file by receiving the information from the server. Therefore, the operating states including a operation state of the remote file can be also resumed.

In another use, the server requests the application program of the client to close a processed file, and stores the information about the operating state of the client and the information about the connection between the application programs of the client when the file has been closed. That is, the operating state of the client can be saved without saving information about the file opened by the application program. Therefore, the operating states of the client at a point in time when the client closes the file are resumed in this manner.

According to the above, the user can use again the file in the server by resuming the connection between the application program of the client and the file of the server.

Also, the opened state of the file in the server can be saved and resumed in synchronism with a power-ON and OFF of the server. This prevents the file of the server used by a first client from access from a second client as long as the operating state of the first client is saved in the server to keep consistency between the operating states and the corresponding files.

Also, regions for retaining the operating states can be saved and resumed in units of user names. This allows an user to resume the operating states at any client by designating the user name to the server.

BRIEF DESCRIPTION OF THE DRAWINGS

FIG. 5 is a flowchart of typical steps performed by the initialization program 44 included in FIG. 1;

FIG. 8 is a view of a typical open file table 11 included in FIG. 1;

FIG. 9 is a view of another open file table 11 included in FIG. 1;

FIG. 10 is a view of an open file table retaining region 21 included in FIG. 1;

FIG. 11 is a schematic view of a distributed information processing system practiced as the second embodiment of the invention;

FIG. 12 is a view of a typical open file table 11 for use with the second embodiment:

FIG. 13 is a view of another open file table 11 for use with the second embodiment;

FIG. 17 is a flowchart of typical steps performed by the resume-request processor 314 included in FIG. 14.

DETAILED DESCRIPTION OF PREFERRED EMBODIMENTS

Figure 1:
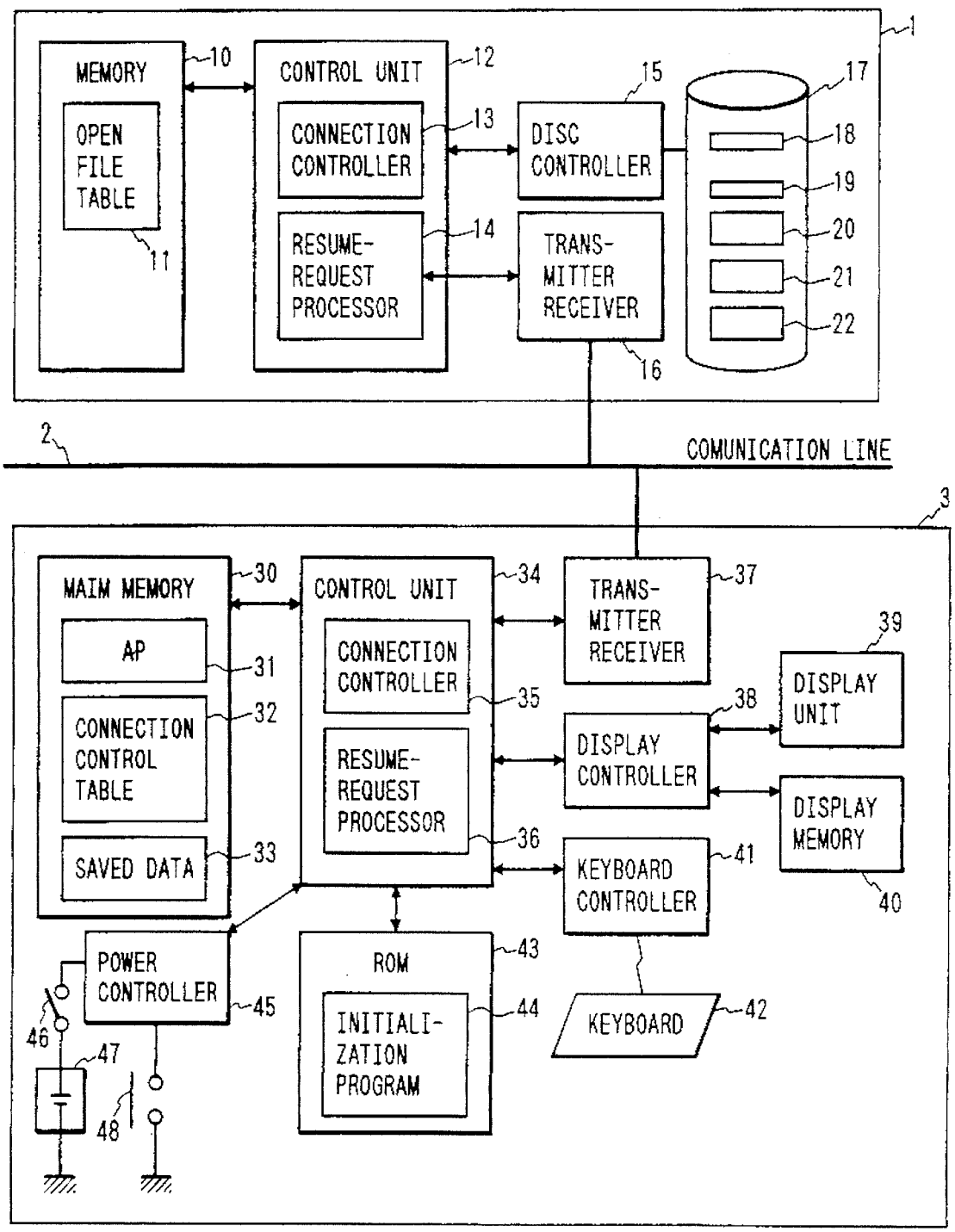
FIG. 1 is a block diagram of a distributed information processing system practiced as the first embodiment of the invention.

FIG. 1 shows a block diagram of a distributed information processing system practiced as a first embodiment of the invention. The distributed information processing system includes a server 1, a communication line 2, and a client 3. The server 1 further includes a memory 10, an open file table 11, a control unit 12, a connection controller 13, a resume-request processor 14, a disc controller 15, a transmitter receiver 16, and a magnetic disc 17. The magnetic disc 17 contains files 18 and 19, a group of regions for retaining operating states 20, an open file table retaining region 21, and a shared use setting table 22. The client 3 further includes a main memory (RAM) :50, an application program (AP) 31, a connection control table 32, a saved data region 33, a control unit 34, a connection controller 35, a resume-request processor 36, a transmitter-receiver 37, a display controller 38, a display unit 39, a display memory 4-0, a keyboard controller 41, a keyboard 42, a ROM 43, an initialization program 44, a power controller 45, a power switch 46, a power supply battery 47, and a resume switch 48.

The state in which the client 3 is operating an application program is called an operating state. In the operating state, the application program 31 of the client 3 accesses files 18–19 on the magnetic disc 17 of the server 1 for processing via the communication line 2 by using the connection controller 35. Below is a description of how the application program 31 accesses the file 18 on the magnetic disc 17. It is assumed that the file 18 has a path name "/usr/a/abc". The administrator of the server 1 designates in advance specific files for shared use by users of the clients. The shared use settings are provided by the shared use setting table 22 on the magnetic disc 17. Between the connection controller 17 of the server 1 and the connection controller 35 of the client 3, there are established connection control settings in the form of the transmitter-receiver 16, communication line 2 and transmitter-receiver 37.

Figures 4, 6, 7:
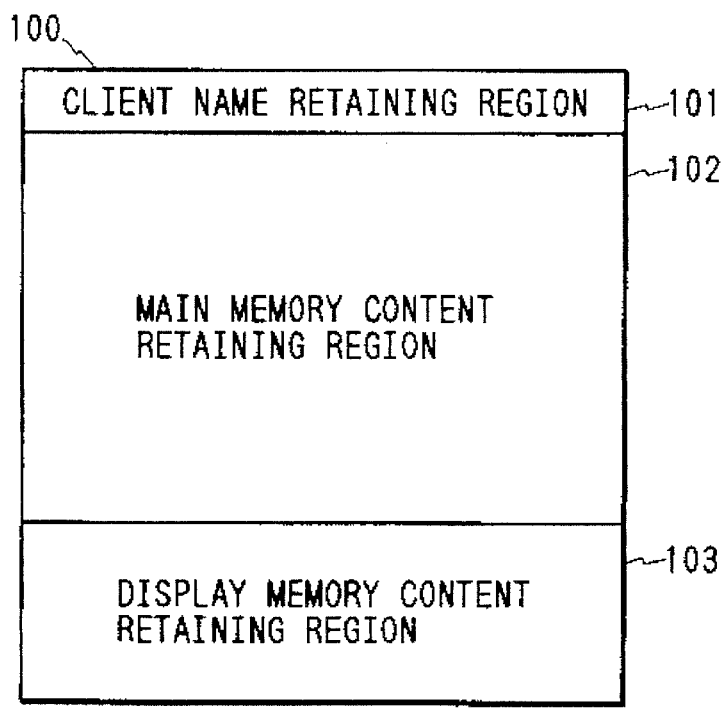
FIG. 4 is a view of a plurality of operating state retaining regions set in the retaining region group 20.
FIG. 6 is a view of a typical connection control table 32 included in FIG. 1.
FIG. 7 is a view of a typical shared use setting table 22 included in FIG. 1.

FIG. 7 shows a typical shared use setting table 22. In FIG. 7, the right-hand column "directory name or file name" denotes the names of directories or files on the magnetic disc 17, and the left-hand column "shared name" indicates the names of shared files designated by the administrator in conjunction with the directory names or file names.

In operation, the application program 31 first notifies the connection controller 35 of a request for connecting a drive "A" to a shared file named "aaa" corresponding to the directory which the file 18 is on. The request is sent together with the shared file name and the drive name. Upon receipt of the connection request, the connection controller 35 notifies the connection controller 13 of the connection re quest and the shared file name through the transmitter-receiver 37, communication line 2 and transmitter-receiver 16. Upon receiving the connection request, the connection controller 13 references the shared use setting table 22 to verify the presence of the shared file and notifies the connection controller 35 of a response to that request, again through the transmitter-receiver 16 communication line 2 and transmitter-receiver 37. Upon receipt of the response, the connection controller 35 updates the connection control table 32 in the main memory 30.

FIG. 6 shows a typical connection control table 32. The contents of the table are updated by the connection controller 35 as a result of the connection request and the response made thereto. The left-hand column "drive name" indicates drive names associated with shared files denoted in the right-hand column "shared file name." The processing of the connection controller 35 and that of the connection controller 13 combine to establish the connection of the server 1 to the file 18.

The application program 31 then opens the file 18 in preparation for file access operations including read, write and file pointer operations on the opened file. Besides requesting the connection controller 35 to open the file 18, the application program 31 notifies the controller 35 of a path name "A:/abc." This path name is obtained as follows: the directory name "/user/a" is removed from the path name "/usr/a/abc" in the file 18 to be opened, and the remaining file name "/abc" is added to the drive name "A:" designated in the previously established connection. The result is the path name "A:/abc." Upon receipt of the file opening request along with the path name "A:/abc," the connection controller 35 references the connection control table 32 using the drive name "A:" and the file name "/abc" separately, thereby obtaining a shared file name "aaa" corresponding to the drive name "A:". Furthermore, the connection controller 35 adds the file name "/abc" to the shared file name "aaa" to create a network name "aaa/abc." The network name "aaa/abc" is then sent together with the file opening request to the connection controller 13 through the transmitter-receiver 37, communication Line 2 and transmitter-receiver 16. On receiving the file opening request as well as the network name "aaa/abc," the connection controller 13 of the server 1 searches through the open file table 11 to see if the file 18 designated by the network name "aaa/abc" is already opened.

FIG. 8 shows a typical open file table 11. The left-hand column "network name" indicates network names, the middle column "path name" denotes the file path names corresponding to the network names, and the right-hand column "file identifier" lists the file identifiers when the respective files are opened.

If the search has indicated that the network name is not among the opened files (i.e., if the open file table 11 of FIG. 8 does not contain the network name "aaa/abc"), that means the file 18 (with network name "aaa/abc") requested to be opened has not been opened yet. Thus the connection controller 13 judges that the target file 18 can be opened, and causes the disc controller 15 to open the file 18 on the magnetic disc 17. If the file 18 is successfully opened, the connection controller 13 additionally stores in the open file table 11 the relationship between the network name, path name and the file identifier in connection with the opened file. FIG. 9 shows a typical open file table 11 generated after the additional storage of the above mentioned relationship therein. Through the transmitter-receiver 16, communication line 2 and transmitter-receiver 37, the connection controller 13 notifies the connection controller 35 that the target file has been successfully opened. If the target file is already opened so that the attempt to open it has failed, the connection controller 35 notifies the application program 31 of the failure to open the file.

As opposed to the case where the target file is yet to be opened and may be opened if requested, there is the case in which the target file is already opened, the target file name being contained in the open file table 11. In the latter case, the connection controller 13 judges that the attempt to open the file has failed and notifies the connection controller 35 thereof. The processing by the connection controller 13 to deal with the failure to open the file is needed to prevent the same file from getting updated by a plurality of clients. Concurrent access to the same file by multiple clients makes the file contents unpredictable.

Following is a description of how to retain the operating states when a user calls on the client 3 to do so. The power controller 45 powers all component devices of the client 3, and monitors the operating state of the resume switch 48 and that of the keyboard controller 41. With the power switch 46 turned on, the resume-request processor 36 is started in one of two cases: when the user pushes the resume switch 48, or when the user issues a resume command through the keyboard 42.

Figure 2:
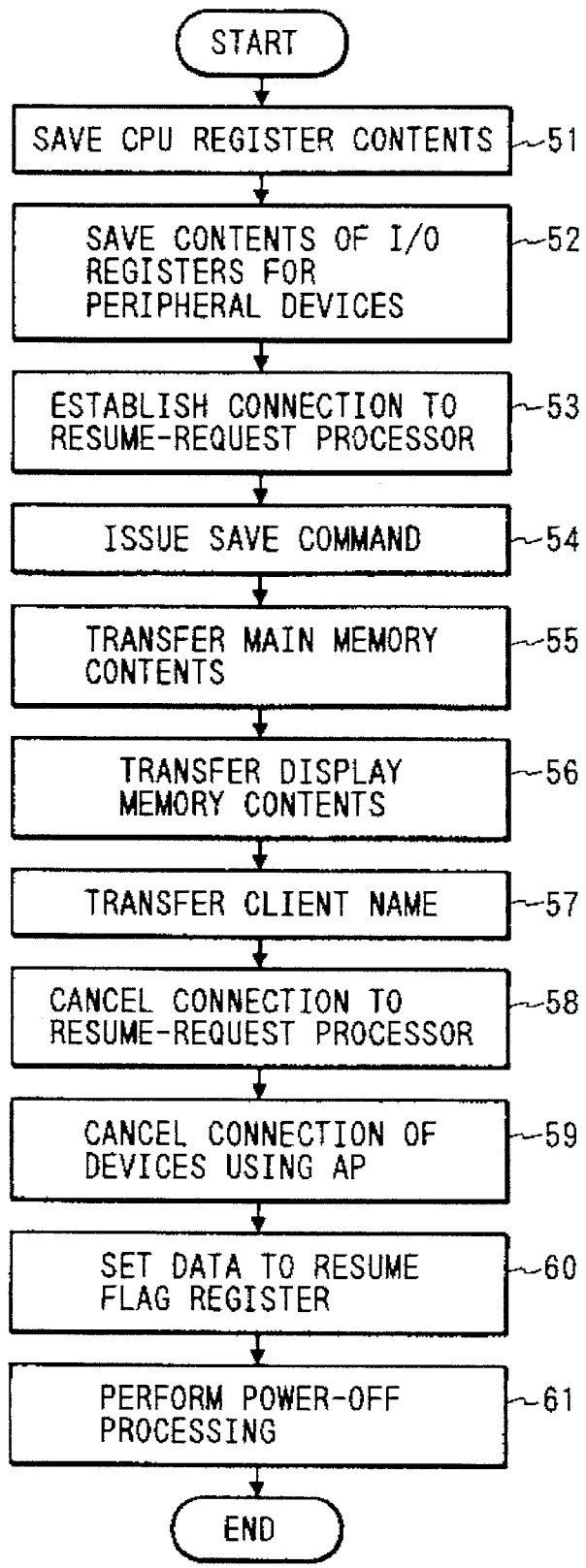
FIG. 2 is a flowchart of a typical steeps performed by the resume-request processor 36 included in FIG. 1.

FIG. 2 shows a flowchart of the processing in the resume-request processor 36. A resume-request processor program whose steps are shown in FIG. 2 carries out the processing of the resume-request processor 36. In step 51, the register contents of the CPU constituting the control unit 34 are saved into the saved data region 33 of the main memory 30. In step 52, the contents of the I/O registers for such peripheral devices as the display controller 38 and keyboard controller 41 are read out and saved into the saved data region 33 of the main memory 30. In step 53, connection is established between the resume-request processor 36 of the client 3 and the resume-request processor 14 of the server 1 so as to set up a data transmission path therebetween. In step 54, a save command is issued to the resume-request processor 14 via the transmitter-receivers 16, 36 and communication line 2. In step 55, the contents of the main memory 30 are transferred to the resume-request processor 14 via the transmitter-receivers 16, 36 and communication line 2. In step 56, the contents of he display memory 40 are transferred to the resume-request processor 14 via the transmitter-receivers 16, 36 and communication line 2. In step 57, the client name given uniquely to the client 3 beforehand is transferred to the resume-request processor 14 via the transmitter-receivers 16, 36 and communication line 2. In step 58, the connection to the resume-request processor 14 is canceled. In step 59, the connection controller 35 is requested to cancel the connection of all drives of which the names are contained in the connection control table 32 (see FIG. 6) and which are operating the application program 31. In step 60, data representing the retained operating state are written to a resume flag register contained in the power controller 45. Finally, in step 61, a controller 23 causes the power controller -15 to stop supplying power to all the component devices other than the controller 45.

The resume-request processor 14 of the server 1 stores the contents of the main memory 30, the contents of the display memory 40, and the client name, into the group of operating state retaining regions 20 on the magnetic disc 17, in synchronism with steps 55, 56 and 57, respectively in FIG. 2.

FIG. 4 shows contents of an operating state retaining area an operating state retaining area 100 provided on the magnetic disc 17 comprises a client name retaining region 101, a main memory content retaining region 102, and a display memory content retaining region 103.

Figure 3:
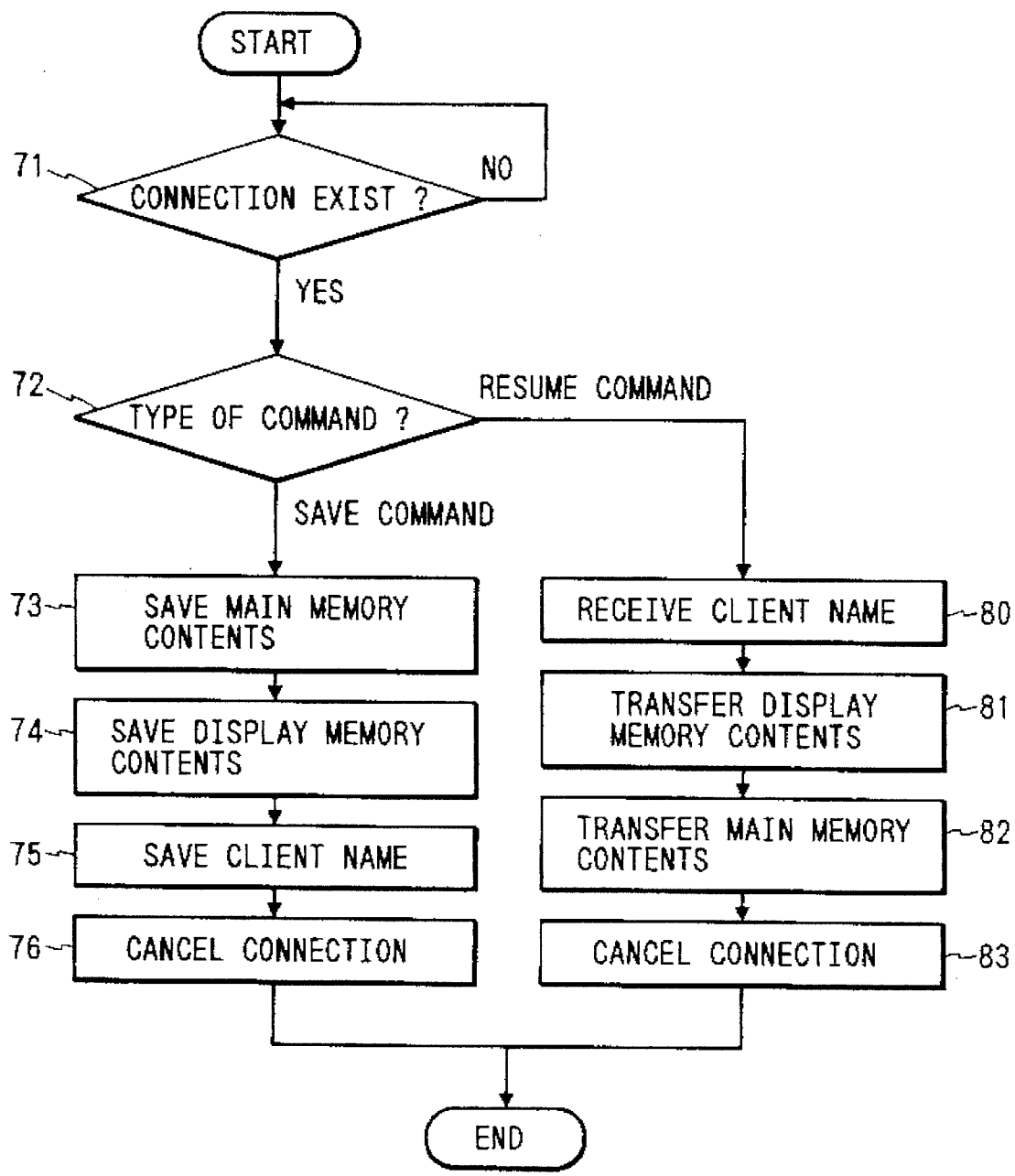
FIG. 3 is a flowchart of typical steps performed by the resume-request processor 14 included in FIG. 1.

FIG. 3 shows a flowchart of the processing in the resume-request processor 14. A resume-request processor program whose steps are shown in FIG. 3 carries out the processing of the resume-request processor 14. In step 71, a check is made to see if there exists the connection made in step 53 with the resume-request processor 36. If no such connection exists, step 71 is reached again for another check. If the connection is found to exist, step 72 is reached. In step 72, a check is made to see if the command coming from that connection is a save command or resume command. If the save command is detected, step 73 is reached; if the resume command is detected step 80 is reached. In step 73, the contents of the main memory transferred in step 55 via the transmitter-receivers 16, 37 and communication line 2 are stored into the main memory content retaining region 102. In step 74, the contents of display memory transferred in step 56 via the transmitter-receivers 16, 37 and communication line 2 are stored into the display memory content retaining region 103. In step 75, the client name transferred in step 57 via the transmitter-receivers 16, 37 and communication line 2 are stored into the client name retaining region 101. Finally, in step 76, the connection of the transmitter-receivers 16, 37 and communication line 2 is canceled.

The processing of the resume-request processor 36 for the client 3 and that of the resume-request processor 14 for the server 1 combine to save the operating state of the client 3, provided that the server 1 is turned on and that the opened file state of the server 1 (known from the open file table 11) remains unchanged. If the server 1 is turned off while the resume-request processors 36 and 14 are in the process of preserving the operating state, the information about the opened file state of the server 1 is lost, and the file being opened by the application program 31 of the client 3 is closed. Immediately before the server 1 is turned off, the open file table 11 minus the fife identifiers therein is saved into the open file table retaining region 21 (see FIG. 10) on the magnetic disc 17. When the server 1 is turned on later, the saved data of the open file table 11 are read from the open file table retaining region 21 so that the files corresponding to the path names in the saved data are opened again on the magnetic disc 17 of the server 1. New file identifiers are acquired for the opened files so that a new open file table 11 is created on the basis of the saved state of the old open file table 11. The processing of the resume-request processors 36 and 14 for the client 3 and server 1, the processing of the server 1 performed when it is turned off, and the processing of the server 1 as it is turned on make it possible to save the operating state of the client 3 along with the opened file state when the server 1 is turned off. That is, the operating state of the client 3 and the opened file state are resumed when the server 1 is later turned on.

How the operating state is resumed will be described with reference to FIGS. 1, 3, 4 and 5. With the operating state preserved, the power controller 45 resumes supplying power to all component devices constituting the client 3 in one of two cases: when the power controller 45 finds that the user has pushed the resume switch 48, or when the power controller 45 finds that the user has issued a resume command through the keyboard 42. In turn, the control unit 34 executes the initiation program 44 stored in the ROM 43.

FIG. 5 shows a flowchart of the processing by the initialization program 44. In step 111, a check is made to see if the operating state is saved in the resume flag register of the power controller 45. If the check has revealed that no operating state is saved, step 121 is reached for initialization. In step 121, as with information processors having no resuming capabilities, the main memory, peripheral devices and other component units are checked and initialized in preparation for the activation of an application program by the user. If the operating state is found to be saved, step 112 is reached. In step 112, the initialization program of the client 3 is connected to the resume-request processor 14 of the server 1 so as to establish a data transmission path therebetween. In step 113, the resume-request processor 14 is fed with a resume command via the transmitter-receivers 16, 37 and communication line 2. In step 114, the resume-request processor 14 is supplied via the transmitter-receivers 16, 37 and communication 2 line with the client name which is given uniquely to the client 3 and which is set in the ROM 43 of the client 3. In step 115, the data of the display memory 40 transferred from the resume-request processor 14 via the transmitter-receivers and communication line are stored into the display memory 40. In step 116, the data of the main memory 30 transferred from the resume-request processor 14 via the transmitter-receivers 16, 37 and communication 2 line are stored into the main memory 30. In step 117, the connection with the resume-request processor 14 is disestablished. In step 118, the connection of the application program 31 in effect when the operating state was saved is reestablished in accordance with the contents of the connection control table 32 resumed in the main memory 30 in step 116. In step 119, the data of the peripheral device I/O registers in the saved data region 33 of the resumed main memory 30 are read out therefrom and set in the I/O registers for the peripheral devices including the display controller 38 and keyboard controller 41 of the client 3. Finally, in step 120, the CPU register data saved in the saved data region 33 of the main memory 30 are read out therefrom and set to the CPU constituting the control unit 34.

In step 113 where the save command is issued and in step 114 where the client name is transferred, the resume-request processor 14 of the server 1 works to resume the operating state. That is, the resume-request processor 14 transfers the contents of the display memory 40 and those of the main memory 30 to the initialization program 44 of the client 3. How the transfer is accomplished will be described with reference to FIG. 3. In step 71, a check is made to see if there exists the connection made in step 112 with the resume-request processor 14. If the connection exists, step 72 is reached. In step 72, a check is made on the type of the command received through the transmitter-receivers 16, 37 and communication line 2. If a resume command is detected in step 72, step 80 is reached. In step 80, the client name transmitted through the transmitter-receivers and communication line is received. A search is made for the region having the same client name through the group of operating state retaining regions 20 on the magnetic disc 17. In step 81, the saved data of the display memory 40 are read from the display memory content retaining region 103 and transferred to the initialization program 44 via the transmitter-receivers and communication line. In step 82, the saved data of the main memory content retaining region 102 are read out and transferred to the initialization program 44 via the transmitter-receivers 16, 37 and communication line 2. Finally, in step 83, the connection of the transmitter-receivers 16, 37 and communication line 2 is disestablished. The above processing of the initialization program 44 and that of the resume-request processor 14 combine to resume the operating state of the client 3 together with the state of the opened file to which the client was connected. Although there is only one client in connection with the first embodiment shown in FIG. 1, a plurality of clients may alternatively be connected to the server of a distributed information processing system according to the invention. Under the multiple client scheme, a plurality of operating state retaining regions are set aside on the magnetic disc 17 of the server 1 so that the operating state of any one client may be preserved and resumed.

The second embodiment of the invention will be described with reference to FIGS. 11, 12 and 13.

FIG. 11 is a distributed information processing system practiced as the second embodiment of the invention. In FIG. 11, the distributed information processing system comprises a server 200, clients 201, 202, and a communication line 203. The client name retaining region 101 in the operating state retaining area 100 (comprising the group of operating state retaining regions 20) for the first embodiment is replaced by a user name retaining region for the second embodiment. In the resume-request processor program 70 for the resume-request processor 14, step 75 in which a client name is saved is replaced for the second embodiment by a step wherein a user name is saved. Furthermore, step 80 in which the client name is received is replaced for the second embodiment by a step wherein the user name is received. The clients 201 and 202 have the same architecture. In the resume-request unit program 50 for the resume-request unit 36 of the client 3, step 57 in which the client name is transferred is replaced for the second embodiment by a step wherein the user name is transferred. In the initialization program 110, step 114 in which the client name is transferred is replaced for the second embodiment by a step in which the user name is transferred.

FIG. 12 shows a typical open file table 11, and FIG. 13 shows another typical open file table 11. As with the open file table of FIG. 8 for the first embodiment, each entry in the tables 11 of FIGS. 12 and 13 corresponds to each file being opened. The left-hand middle and right-hand columns of the first embodiment indicating network names, path names and file identifiers, respectively, are also used in the second embodiment, supplemented by another column denoting the names of users opening the respective files. The open file table of FIG. 13 is created by supplementing the open file table of FIG. 12 with another file opened by a user named "John" and represented by a path name "usr/a/abc." These two open file tables of FIGS. 12 and 13 allow the second embodiment to retain the name of the user who is opening (i.e., using) a given file. When these tables are saved and resumed, the user names can also be saved and resumed.

With the second embodiment, the regions for retaining operating states are controlled in units of user names in the manner described. This makes it possible illustratively for the second client 202 to resume the operating state saved by the first client 201, or vice versa Although the second embodiment involves two clients, the invention may also apply to setups involving three or more clients.

Figure 14:
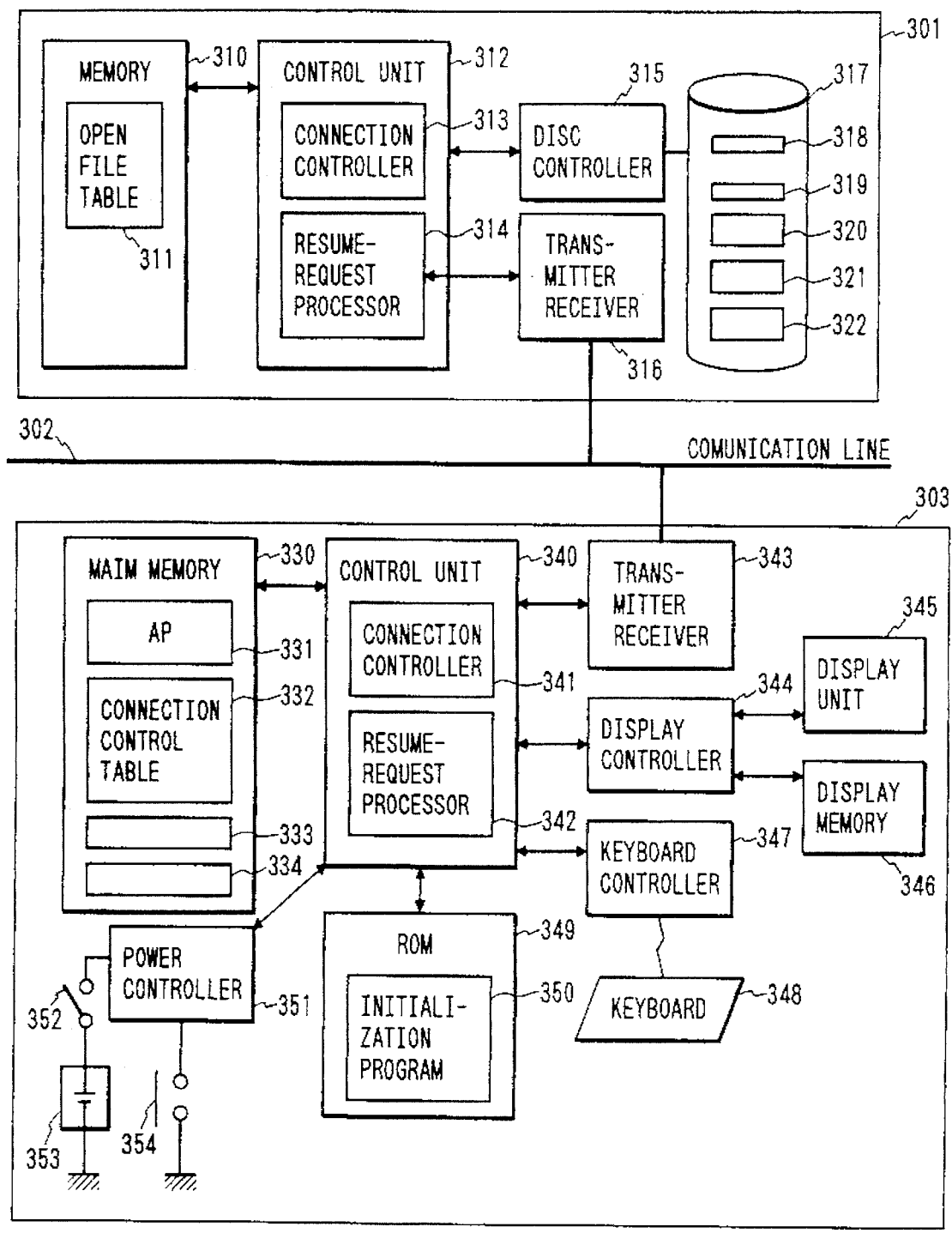
FIG. 14 is a schematic view of a distributed information processing system practiced as the third embodiment of the invention.

FIG. 14 shows a distributed information processing system practiced as the third embodiment of the invention. In FIG. 14, the distributed information processing system comprises a server 301, a communication line 302, and a client 303. The server 301 further comprises a memory 310, an open file table 311, a controller 312, is a connection controller 313, a resume request processor 314, a disc controller 315, a transmitter-receiver 316, a magnetic disc 317, files 318, 319 in the magnetic disc 317, an operating state retaining area 320, an open file table retaining region 321, and a shared use setting table 32. The client 303 further comprises a main memory (RAM) 330, an application program (AP in the figure) 331, a connection control table 332, a saved data region 333, a temporary storage region 334, a control unit 340, a connection controller 341, a resume-request unit 342, a transmitter-receiver 343, a display controller 344, a display unit 345, a display memory 346, a keyboard controller 347, a keyboard 348, a ROM 349, an initialization program 350, a power controller 351, a power switch 352, a power supply battery 353, and a resume switch 354. The state in which a user of the client 303 is operating an application program is called an operating state. In the operating state, the application program 331 of the client 303 opens a file on the magnetic disc 317 of the server via the connection controller 341, reads part of the opened file into the temporary storage region 334, and carries out necessary processing while storing information about changes made to that file into the temporary storage region.

Preparatory to the application program 331 gaining access to the file 318 on the magnetic disc 317, necessary connection needs to be established appropriately. It is assumed that the file 318 has a path name "/usr/a/abc". How the connection is established will be described. The administrator of the server 301 designates in advance specific files for shared use by users of the client. The shared use settings are provided by the shared use setting table 322 on the magnetic disc 317. Between the connection controller 313 of the server 301 and the connection controller 341 of the client 303, there are established connection control settings through the transmitter-receiver 316, communication line 302 and transmitter-receiver 343. FIG. 7 also shows a typical shared setting table 322 used by the third embodiment. The application program 331 first notifies the connection controller 313 of a request for connecting a drive "A:" to a shared file named "aaa" corresponding to the directory which the file 318 is on. The request is sent together with the shared file name and the drive name. Upon receipt of the connection request, the connection controller 341 notifies the connection controller 313 thereof along with the shared file name through the transmitter-receiver 343, communication line 302 and transmitter-receiver 316. On receiving the connection request, the connection controller 313 references the shared use setting table 322 (FIG. 7) to verify the presence of the shared file and notifies the connection controller 341 of a response to that request, again through the transmitter-receiver 316, communication line 302 and transmitter-receiver 343. Upon receipt of the response, the connection controller 341 updates the connection control table 332 in the main memory 330 (FIG. 6) of the client 303. FIG. 6 also shows a typical connection control table 332 used by the third embodiment. The contents of the table are updated by the connection controller 341 as are result of the connection request and the response made thereto. The processing of the connection controller :341 and that of the connection controller 313 combine to establish the connection of the server 301 to the file 318.

The application program 331 then opens the file 318 in preparation for file access operations including read, write and file pointer operations on the opened file. How the file 318 is opened will be described as follows. Besides requesting the connection controller 341 to open the file 318, the application program 331 notifies the controller 341 of a path name "/user/a" This path name is obtained as follows: the directory name "/user/a" is removed from the path name "/usr/a/abc" in the file 318 to be opened, and the remaining file name "/abc" is added to the drive name "A:" designated in the previously established connection. The result is the path name "A:/abc." Upon receipt of the file opening request along with the path name "A:/abc," the connection controller 341 references the connection control table 332 (FIG. 6) using the drive name "A:" and the file name "/abc" separately, thereby obtaining a shared file name "aaa" corresponding to the drive name "A:". Furthermore, the connection controller 341 adds the file name "/abc" to the shared file name "aaa" to create a network name "aaa/abc". The network name "aaa/abc" is then sent together with the file opening request to the connection controller 313 through the transmitter-receiver 343, communication line 302 and transmitter-receiver 316. On receiving the file opening request as well as the network name "aaa/abc," the connection controller 313 of the server 301 searches through the open file table 311 to see if the file 318 designated by the network name "aaa/abc" is already opened. FIG. 8 shows a typical open file table 311 used by the third embodiment. If the search has indicated that the network name is not among the opened files (i.e., if the open file table 311 of FIG. 8 does not contain the network name "aaa/abc") that means the file 318 (with network name "aaa/abc") requested to be opened is yet to be opened. Judging that the target file 318 can thus be opened, the connection controller 313 causes the disc controller 315 to open the file 318 on the magnetic disc 317. If the file 318 is successfully opened, the connection controller 313 additionally stores in the open file table 311 the relationship between the network name, path name and the file identifier in connection with the opened file. The open file table 311 of FIG. 8 is generated after the additional storage of the above mentioned relationship therein. Through the transmitter-receiver 316, communication line 302 and transmitter-receiver 343, the connection controller 313 notifies the connection controller 341 that the target file has been successfully opened. If the target file is found to be already opened so that the attempt to open it has failed, the connection controller 341 notifies the application program 331 of the failure to open the file.

As opposed to the case where the target file is yet to be opened and may be opened if requested, there is the case in which the target file is already opened, the target file name being contained in the open file table 311. In the latter case, the connection controller 313 judges that the attempt to open the file has failed and notifies the connection controller 341 thereof. The processing by the connection controller 313 to deal with the failure to open the file is needed to prevent the same file from getting updated by a plurality of clients. Concurrent access to the same file by multiple clients can make the file contents unpredictable.

How the contents of the file 318 are changed will now be described. When the application program 331 of the client 303 opens the file 318 successfully, the program 331 allocates a temporary storage region 334 in the main memory. The application program 331 then reads part of the contents of the file 318 into the temporary storage region 334 through the transmitter-receiver 316, communication line 302 and transmitter-receiver 343. In this state, any changes made by the application program 331 to the file 318 are added to and preserved in the temporary storage region 334 without getting added directly to the file 318. Those changes to the file 318 which are stored in the temporary storage region 334 are reflected in the file 318 as needed upon request by the user of the application program 331 through the transmitter-receiver 316, communication line 302 and transmitter-receiver 343.

How the file 318 is closed by the application program 331 will now be described. H is upon request from the user of the application program 331 that the program 331 closes the file 318. Besides requesting the connection controller 341 to close the file 318, the application program 331 notifies the controller 341 of a path name "A:/abc". This path name is obtained as follows: the directory name "/user/" is removed from the path name "/usr/a/abc" in the file 318 to be closed, and the remaining file name "abc" is added to the drive name "A:" designated in the previously established connection. The result is the path name "A:/abc". Upon receipt of the file closing request along with the path name "A:/abc", the connection controller 341 references the connection control table 332 (FIG. 6) using the drive name "A" and the file name "/abc" separately, thereby obtaining a shared file name "aaa" corresponding to the drive name "A:". Furthermore, the connection controller 341 adds the file name "/abc" to the shared file name "aaa" to create a network name "aaa/abc." The network name "aaa/abc" is then sent together with the file closing request to the connection controller 313 through the transmitter-receiver 343, communication line 302 and transmitter-receiver 316. On receiving the file closing request as well as the network name "aaa/abc," the connection controller 313 of the server 301 searches through the open file table 311 to see the file 318 designated by the network name "aaa/abc" is already closed.

FIG. 9 shows a typical open field table 311 in effect just before the file closing is carried out. The left-hand column "network name" indicates network names, the middle column "path name" denotes the file path names corresponding to the network names, and the right-hand column "file identifier" lists the file identifiers in effect when the respective files are opened.

If the search has indicated that the network name is found among the opened files (i.e., if the open file table 311 of FIG. 8 contains the network name "aaa/abc"), that means the file 318 (with network name "aaa/abc") requested to be closed is yet to be closed. Judging that the target file 318 can thus be closed, the connection controller 313 causes the disc controller 315 to close the file 318 on the magnetic disc 317. If the file 318 is successfully closed, the connection controller 313 deletes from the open file table 311 the relationship between the network name, path name and the file identifier in connection with the closed file. FIG. 7 also shows a typical open file table 311 generated after the above mentioned relationship is deleted therefrom. Through the transmitter-receiver 316, communication line 302 and transmitter-receiver 343, the connection controller 313 notifies the connection controller 341 that the target file has been successfully closed.

As opposed to the case where the target file is yet to be closed and may be closed if requested, there is the case in which the target file is already closed, the target file name being deleted from the open file table 311. In the latter case, the connection controller 313 judges that the attempt to close the file has failed and notifies the connection controller 341 thereof.

What follows is a description of how to retain the operating states when a user calls on the client 303 to do so. The power controller 351 powers all component devices of the client 303 except the controller itself, and monitors the operating state of the resume switch 354 and that of the keyboard controller 347. With the power switch 352 turned on, the resume-request unit 342 is started in one of two cases: when the user pushes the resume switch 354, or when the user issues a resume command through the keyboard 348.

Figure 15:
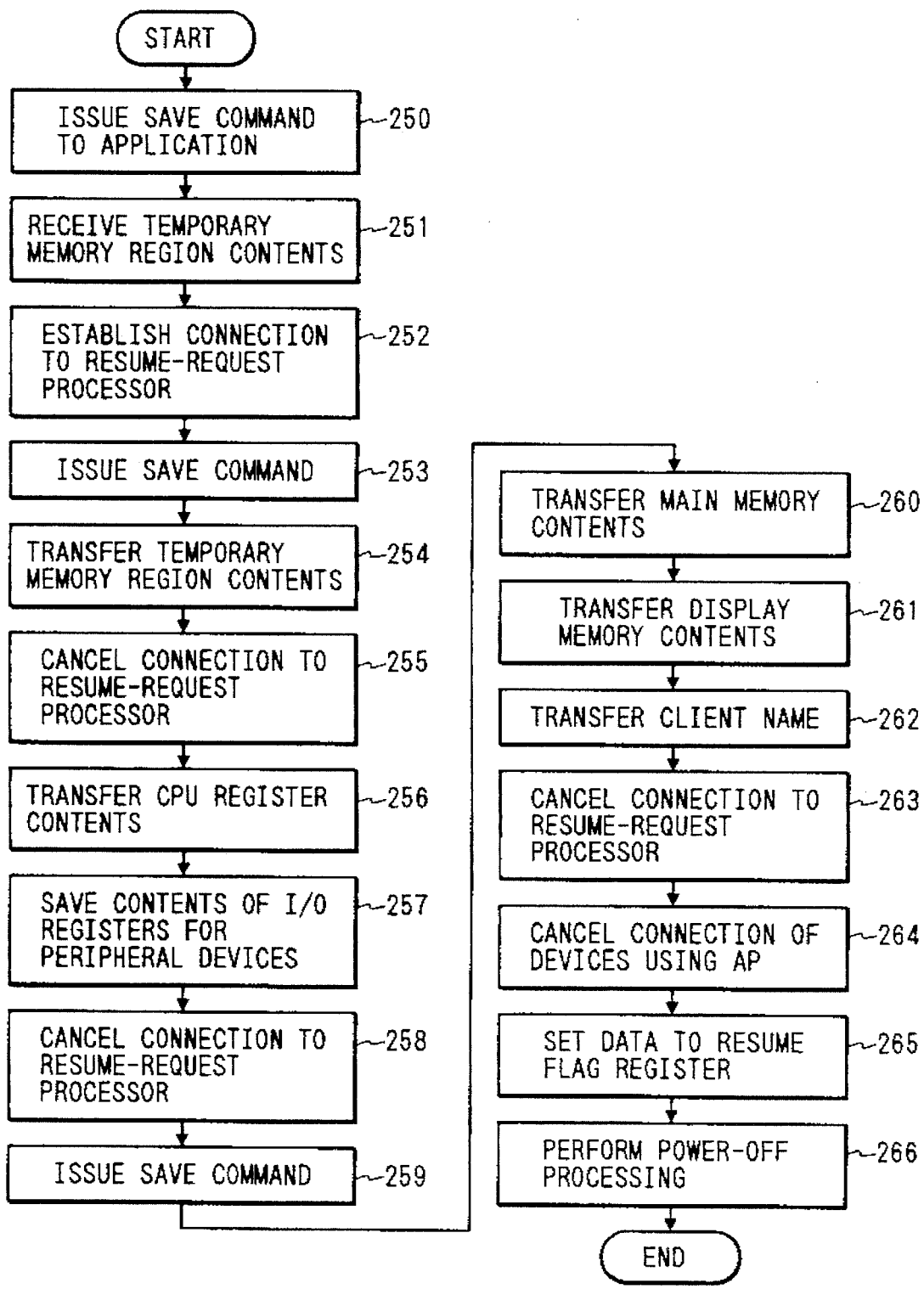
FIG. 15 is a flowchart of typical steps performed by the resume-request unit 342 included in FIG. 14.

FIG. 15 shows a flow chart of the processing in the resume-request unit 342. In step 250, the resume-request unit 342 issues a save command to the application program 331. This causes the application program 331 to transfer the contents of the temporary storage region 334. In step 251, the resume-request unit 342 receives the contents of the temporary storage region 334 transferred by the application program 331. In step 252, the resume-request unit 342 calls on the connection controller 341 to establish connection with the resume-request processor 314 of the server 301. The connection is established through the transmitter-receiver 343, communication line 302 and transmitter-receiver 316. In step 253, the resume-request unit 342 transfers a resume command to the resume-request processor 314 through the connection established. In step 254, the resume request unit 342 transfers to the resume-request processor 314 the contents of the temporary storage region 334 received in step 251. The transfer of the storage contents is accomplished through the same connection established. In step 255, the resume-request unit 342 calls on the connection controller 341 to disestablish the connection with the resume-request processor 314. The steps above allow the application program 331 to change the contents of the file 318. The file 318, after being opened by the application program 331, is eventually closed thereby.

In FIG. 15, step 256 and subsequent steps for the resume-request unit 342 to operate in constitute a procedure for preserving the operating state in effect when the file 318 is closed by the application program 331. In step 256, the resume-request unit 342 moves the register contents of the CPU in the control unit 340 into the saved data region 333 of the main memory 330. In step 257, the resume-request unit 342 reads the contents of the I/O registers in such peripheral devices as the display controller 344 and keyboard controller 347, and places them into the saved data region 333 of the main memory 330. In step 258, the resume-request unit 342 calls on the connection controller 341 to establish connection with the resume-request processor 314 of the server 301. The connection is established through the transmitter-receiver 343, communication line 302 and the transmitter-receiver 316. In step 259, the resume-request unit 342 issues a retain command to the resume-request processor 314 through the connection established. In step 260, the resume-request unit 342 transfers the contents of the main memory 330 to the resume-request processor 314. In step 261, the resume-request unit 342 transfers the contents of the display memory 346 to the resume-request processor 314. In step 262, the resume-request unit 342 transfers the client name set beforehand uniquely to the client 303 to the resume-request processor 314 through the connection established. In step 263, the resume-request unit 342 disestablishes the connection with the resume-request processor 314. In step 264, the resume-request unit 342 calls on the connection controller 341 to disconnect the drives whose names are contained in the connection control table 332 (FIG. 6) so that all connections used by the application program (AP) 331 will be disestablished. In step 265, the resume-request unit 342 writes in a resume-flag register of the power controller 351 a value indicating that the operating state has been retained. Finally, in step 266, the resume-request unit 342 causes the control unit 340 to operate the power controller 351 so that power to all devices except for the power controller 351 itself will be turned off.

Figure 16:
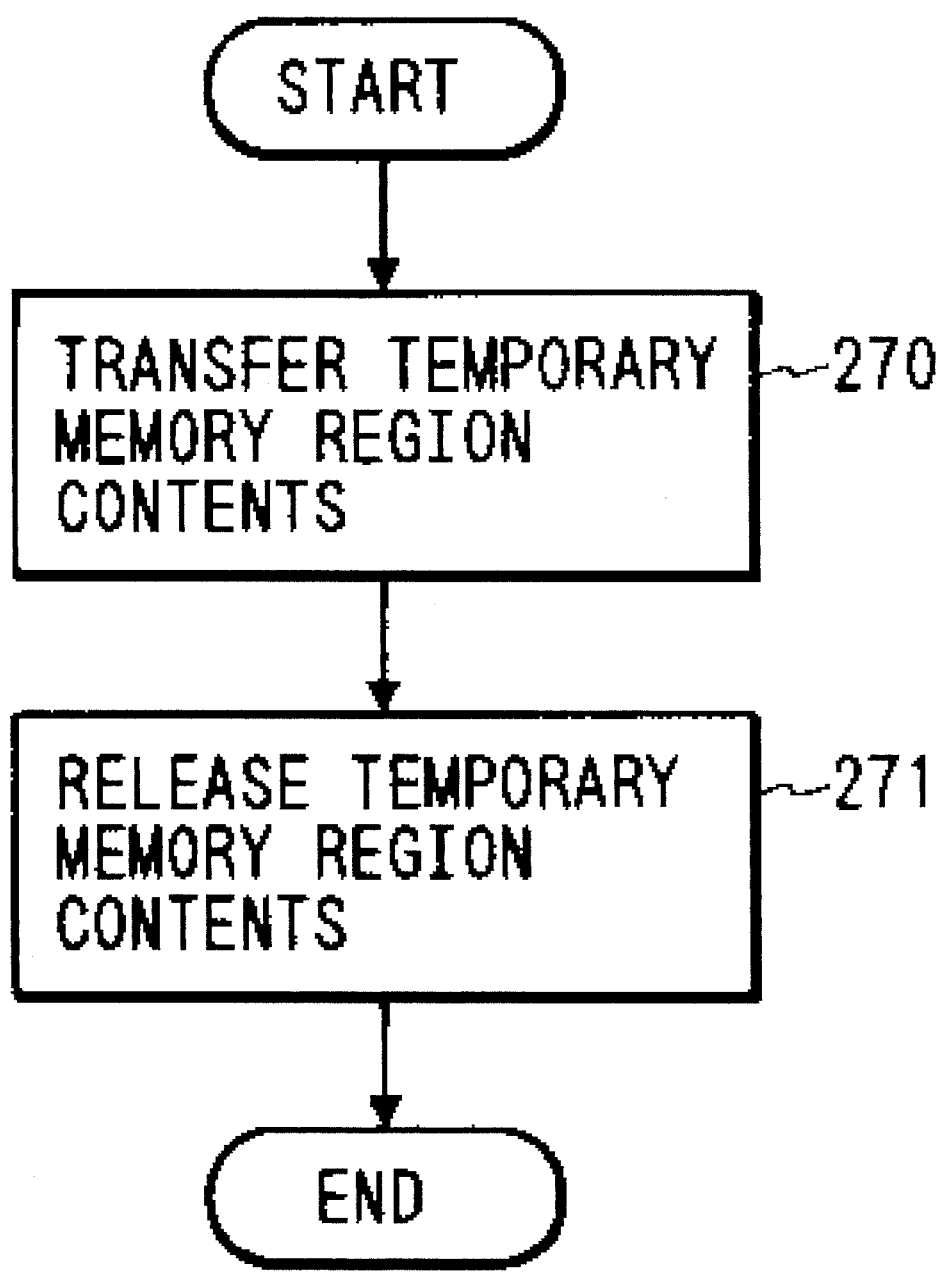
FIG. 16 is a flowchart of typical steps performed by the application program 331 in FIG. 14 upon receipt of a save command.

FIG. 16 shows a flowchart of steps executed by the application program 331 upon receipt of the save command. When the application program 331 receives the save command issued by the resume-request unit 342 in step 250 of FIG. 15, the processing of FIG. 16 takes place. In step 270, the application program transfers the contents of the temporary storage region 334 to the resume-request unit 342. In step 271, the application program 331 deletes the temporary storage region 334 from the main memory 330, releases the memory area allocated to that region 334, and causes the file 318 to be closed.

In synchronism with step 254 (contents of the temporary storage region 334 transferred), the resume-request processor 314 of the server 301 preserves the contents received by correcting the file 318 appropriately. Furthermore, the resume-request processor 314 stores the transferred data in the operating state retaining area 320 on the magnetic disc 317 in synchronism with the transfer of the data saved in step 257 (contents of the main memory 330 transferred), in step 258 (contents of the display memory 346 transferred) and in step 259 (the client name transferred).

FIG. 17 shows a flowchart of processing in the resume-request processor 314. In FIG. 4, an operating state retaining area 100 provided on the magnetic disc 317 comprises a client name retaining region 101, a main memory content retaining region 102, and a display memory content retaining region 103. In step 280 of FIG. 17, the resume-request processor 314 checks to see if there is the connection established by the resume-request unit 342. If no such connection is found, step 280 is reached again repeatedly for check If the connection is found to be established, step 281 is reached, In step 281, the resume-request processor 314 checks to see if any command is received through the connection established. If no command is found to be received, step 281 is reached again. If any one of a save command, a retain command and a resume command is received, the next step to go to is determined by the type of the command received. If a save command is received, step 282 is reached; if a retain command is received, step 285 is reached; if a resume command received, step 288 is reached. What takes place when the save command is received is as follows: In step 282, the resume-request processor 314 receives the contents of the temporary storage region 334 transmitted through the connection established. In step 283, the resume-request processor 314 saves the contents of the temporary storage region 334 into the file 318 opened by the application program, thereby updating the file 318. In step 284, the resume-request processor 314 closes the file 318. Finally, in step 291, the resume-request processor 314 disestablishes the connection, and step 280 is reached again for another check on the connection.

The operating state of the client is retained as follows. In step 280, the resume-request processor 314 checks to see if there is the connection established by the resume-request unit 342. If no such connection is found, step 280 is reached again repeatedly for check. If the connection is found to be established, step 281 is reached. In step 281, the resume-request processor 314 checks to see if any command is received through the connection established. If no command is found to be received, step 281 is reached again. If any one of a save command, a retain command and a resume command is received, the next step to go to is determined by the type of the command received. When the operating state of the client is to be retained, the retain command issued in step 259 is received in step 281. With the retain command received, step 285 is reached in which the resume-request processor 314 places into the main memory content retaining region 102 the contents of the main memory transferred through the connection established. In step 286, the resume-request processor 314 places into the display memory content retaining region 103 the data transferred in step 261 through the established connection. In step 287, the resume-request processor 314 places into the client name retaining region 101 the client name transferred in step 262 through the established connection. Lastly, in step 291, the resume-request processor 314 disestablishes the connection, and step 280 is reached for another check on the connection. The processing of the resume-request unit 342 in the client 303 and the processing of the resume-request processor 314 in the server 301 combine to retain the operating state of the client 303 when the server 301 remains on.

If the server 301 is turned off while the operating state is kept retained, there is no file being opened by the application program 331 of the client 303. Thus unlike the first embodiment, the third embodiment eliminates the need for retaining the open file table 311 when the server 301 is turned off. If the server 301 is turned off with no operating state preserved, the file of the server used by the application program 331 of the client 303 is opened the moment power is removed from the server 301. This results in the loss of any changes made to the target file to be opened, those changes having being held in the temporary storage region 334. In that case, the loss is prevented by calling on the resume-request unit 342 of the client 303 to start the processing of FIG. 15 before the server 301 is turned off.

The operating state of the client 303 is resumed as follows. FIG. 5 shows a flowchart of the initialization program 350, and FIG. 17 shows a flowchart representing the processing of the resume-request unit 342. With the operating state retained, the power controller 351 first detects the issuance of a resume command by the user pressing the resume switch 354 or operating the keyboard 348. The resume command causes the power controller 351 to resume the supply of power to all devices making up the client 303. This causes the control unit 340 to execute the initialization program 350 held in the ROM 349). In step 111 of FIG. 5, a check is made on the value in the resume flag register of the power controller 351 to see if the operating state is retained. If the check has revealed that no operating state is retained, step 121 is reached for initialization. In step 121, as with information processors having no resuming capabilities, the main memory, peripheral devices and other component units are checked and initialized in preparation for the activation of an application program by the user. If the operating state is found to be retained, step 112 is reached. In step 112, the initialization program 350 of the client 303 is connected to the resume-request processor 314 of the server 301 so as to establish a data transmission path therebetween. In step 113, the resume-request processor 314 is fed with the resume command via the connection established with transmitter-receivers 316, 343 and communication line 302. In step 114, the resume-request processor 314 is supplied through the established connection with the client name which is given uniquely to the client 303 and which is set in the ROM 349 of the client 303. In step 115, the data of the display memory 340 transferred from the resume-request processor 314 through the established connection are stored into the display memory 340. In step 116, the data of the main memory 330 transferred from the resume-request processor 314 through the established connection are stored into the main memory 330. In step 117, the connection with the resume-request processor 314 is disestablished. In step 118, the connection used by the application program 31 when the operating state was retained is reestablished in accordance with the contents of the connection control table 332 resumed in the main memory 330 in step 116. In step 119, the data of the peripheral device I/O registers in the saved data region 333 of the resumed main memory 330 are read out therefrom and set in the I/O registers for the peripheral devices including the display controller 344 and keyboard controller 347 of the client 303. Finally, in step 120, the CPU register data saved in the saved data region 333 of the main memory 330 are read out therefrom and set to the CPU constituting the control unit 340.

The resume-request processor 314 of the server 301 processes as follows. The resume-request processor 314 resumes the operating state in accordance with step 113

(resume command issued) and step 114 (client name transferred). That is, the resume-request processor 314 transfers the contents of the display memory 346 and those of the main memory 330 to the initialization program 350 of the client 303.

FIG. 17 shows how the transfer is accomplished. In step 280, a check is made to see if there exists the connection established in step 112 with the resume-request processor 314. If the connection exists, step 281 is reached. In step 289, a check is made to see if any command is received through the connection established. If no command is received, step 281 is reached again; if a command is found to be received, the next step to go to is determined by the type of the command received. Here, a resume command is expected to be received. When the resume command is detected in step 281 step 288 is reached. In step 288, the client name transmitted through the established connection is received. A search is made for the region having the same client name as the one received through the group of operating state retaining regions 320 on the magnetic disc 317. In step 289, the saved data of the display memory 346 are read from the display memory content retaining region 103 and transferred to the initialization program 350 through the established connection. In step 290, the saved data of the main memory content retaining region 102 are read out and transferred to the initialization program 350 through the established connection. Finally, in step 291, the connection employed so far is disestablished.

The above processing of the initialization program 350 and that of the resume-request processor 314 combine to resume the operating state of the client 303 together with the state of the opened file to which the client was connected. Although there is only one client in connection with the third embodiment shown in FIG. 14, a plurality of clients may alternatively be connected to the server of a distributed information processing system according to the invention. Under the multiple client scheme, a plurality of operating state retaining regions are set aside on the magnetic disc 317 of the server 301 so that the operating state of any one client may be preserved and resumed.

What is claimed is:

1. An information processing system having a server which stores data in a file, a client for executing an application program and accessing the data stored in the file, and a communication line which connects the server and the client, comprising:

a resume request unit, included in said client, for transferring to said server at a specific time information indicating a last operating state of said client when operation of said client is stopped, requesting said server to transfer said information indicating a last operating state to said client when said client is to resume operation, receiving said information indicating a last operating state from said server, and resuming operation of said client at an operation state indicated by said information indicating a last operating state received from said server; and a resume request processor, included in said server, for receiving said information indicating a last operating state from said resume request unit, saving said information indicating a last operating state received from said resume request unit, and transferring the saved information indicating a last operating state to said resume request unit in response to said request when said client is to resume operation after operation of said client has been stopped.

2. An information processing system according to claim 1, wherein said information indicating a last operating state of said client includes contents of a main memory of said client.

3. An information processing system according to claim 1, wherein said information indicating a last operating state of said client includes contents of a display memory of said client.

4. An information processing system according to claim 1, wherein said information indicating a last operating state of said client includes a name of said client.

5. An information processing system according to claim 1, wherein said information indicating a last operating state of said client also indicates a state of connection between said file of said server and said application program of said last.

6. An information processing system according to claim 5, wherein said state of connection between said file of said server and said application program of said client includes a network name of said file to be opened in said server, a path name of said file to be opened, and an file identifier obtained as a result of said opening said file.

7. An information processing system according to claim 1, wherein said specific time is when an user turns on a switch for resuming at said client.

8. An information processing system according to claim 1, wherein said specific time is when a keyboard of said client issues a resume command.

9. An information processing system according to claim 1, wherein said specific time is before power of said client is turned off, and said resume request unit of the client issues said request when power of said client is turned on.

10. An information processing system according to claim 1, further comprising:

a temporary storage region in a main memory of said client for saving temporary accommodating information indicating changes in contents of said file before said file is closed by said application program of said client, wherein said information indicating a last operating state of said client also includes the temporary accommodating information, and said resume request unit causes said client to resume operation using contents of said temporary storage region.

11. An information processing system having a server which stores data in a file, a plurality of clients for executing an application program and accessing the data stored in said file, and a communication line which connects said server and said clients, comprising:

a plurality of resume request units each being included in a client, each resume request unit for transferring information indicating a last operating state of said client and identification data which identifies said information including a last operation state to said server at a specific time when operation of said client is stopped, requesting said server to transfer said information indicating a last operating state to said client with said identification data when said client is to resume operation, receiving said information indicating a last operation state from said server, and resuming operation of said client at an operation state indicated by said information indicating a last operation state received from said server; and a resume request processor, included in said server, for receiving said information including a last operation state and the identification data from said resume request unit, saving said information indicating a last operation state received from said resume request unit with the identification data, and transferring the saved information indicating a last operation state identified by said identification data to said resume request unit in response to said request when said client is to resume operation after operation of said client has been stopped.

12. An information processing system according to claim 11, wherein said information indicating a last operating state of said client includes contents of a main memory of said client.

13. An information processing system according to claim 11, wherein said information indicating a last operating state of said client includes contents of a display memory of said client.

14. An information processing system according to claim 11, wherein said information indicating a last operating state of said client includes a name of said client.

15. An information processing system according to claim 11, wherein said information indicating a last operating state of said client also indicates a state of connection between said file of said server and said application program of the server.

16. An information processing system according to claim 15, wherein said state of connection between said file of the server and said application program of the client includes a network name of the file to be opened in said server, a path name of said file to be opened, and a file identifier obtained as a result of opening said file.

17. An information processing system according to claim 11, wherein said specific time is when an user turns on a switch for resuming at said client.

18. An information processing system according to claim 11, wherein said specific time is when a keyboard of said client issues a resume command.

19. An information processing system according to claim 11, wherein said specific time is before power of said client is turned off.

20. An information processing system according to claim 11, further comprising:
a plurality of temporary storage regions each being included in a main memory of each of said clients for saving temporary accommodating information indicating changes in contents of said file before said file is closed by said application program, wherein said information indicating a last operating state of said client also includes the temporary accommodating information, and each of said resume request units causes said client to resume operation using contents of said temporary storage region.

21. An information processing system having a server which stores data in a file, a plurality of clients for executing an application program and accessing the data stored in said file, and a communication line which connects the server and said clients, comprising:
a first client having a first resume request unit for transferring to said server at a specific time information indicating a last operating state of the first client and identification data which identifies said information indicating a last operation state when operation of said client is stopped,
a second client having a second resume request unit for requesting said server to transfer said information indicating a last operating state to said second client with said identification data, receiving said information indicating a last operation state from said server, and resuming operation of said client at a last operation state indicated by said information indicating a last operation state received from said server; and
a resume request processor, included in said server, for receiving said information indicating a last operation state and said identification data from said first resume request unit, saving said information indicating a last operation state received from said first resume request unit with said identification data, and transferring the saved information indicating a last operation state identified by said identification data to said second resume request unit in response to said request when said client is to resume operation after operation of said client has been stopped.

22. An information processing system according to claim 21, wherein said information indicating a last operating state of said first client includes contents of a main memory of said client.

23. An information processing system according to claim 21, wherein said information indicating a last operating state of said first client includes contents of a display memory of said first client.

24. An information processing system according to claim 21, wherein said information indicating a last operating state of said first client includes a name of said first client.

25. An information processing system according to claim 21, wherein said information indicating a last operating state of said first client also indicates a state of connection between said file of said server and said application program of said first client.

26. An information processing system according to claim 25, wherein said state of connection between said file of said server and said application program of said first client includes a network name of said file to be opened in said server, a path name of said file to be opened, and a file identifier obtained as a result of opening said file.

27. An information processing system according to claim 21, wherein said specific time is when an user turns on a switch for resuming at said first client.

28. An information processing system according to claim 21, wherein said specific time is when a keyboard of said first client issues a resume command.

29. An information processing system according to claim 21, wherein said specific time is before the power of said first client is turned off.

30. An information processing system according to claim 21, wherein said first client and said second client are constructed with a same architecture.

31. An information processing system according to claim 21, further comprising:
a temporary storage region in a first main memory of said first client for saving temporary accommodating information indicating changes in contents of said file before said file is closed by said application program of said first client, wherein said information indicating a last operating state of said first client also includes said temporary accommodating information, and said first resume request unit causes said client to resume operation using contents of said temporary storage region on a second main memory of said second client.

32. A resume method for an information processing system having a server which stores data in a file, a client for executing an application program and accessing the data stored in said file, and a communication line which connects the server and the client, said resume method comprising the steps of:
transferring to said server at a specific time information indicating a last operating state of said client when operation of said client is stopped;
saving said information indicating a last operation state received from said client in a storage device of said server;

requesting said server to transfer said information indicating a last operating state to said client when said client is to resume operation;

transferring the saved information indicating a last operating state from said server to said client in response to said request from said client when said client is to resume operation; and resuming operation of said client at a last operation state indicated by said information indicating a last operation state transferred from said server when said client is to resume operation after operation of said client has been stopped.

33. A resume method according to claim 32, wherein said information indicating a last operating state of said client includes contents of a main memory of said client.

34. A resume method according to claim 32, wherein said information indicating a last operating state of said client includes contents of a display memory of said client.

35. A resume method according to claim 32, wherein said information indicating a last operating stale of said client includes a name of said client.

36. A resume method according to claim 32, wherein said information indicating a last operating state of said client also indicates a state of connection between said file of said server and said application program of said client.

37. A resume method according to claim 36, wherein said state of connection between said file of said server and said application program of said client includes a network name of said file to be opened in said server, a path name of said file to be opened, and a file identifier obtained as a result of opening said file.

38. A resume method according to claim 32, wherein said specific time is when an user turns on a switch for resuming at the client.

39. A resume method according to claim 32, wherein said specific time is when a keyboard of the client issues a resume command.

40. A resume method according to claim 32, wherein said specific time is before power of said client is turned off, and said client requests transfer of said information and indicating a last operating state when power of client is turned on.

41. A resume method according to claim 32, wherein said client has a temporary storage region in a main memory of said client for saving temporary accommodating information indicating changes in contents of said file before said file is closed by said application program of said client, said information indicating a last operating state of said client also includes said temporary accommodating information, and said client causes said client to resume operation using contents of said temporary storage region.

42. A resume method for an information processing system having a server which stores data in a file, a plurality of clients for executing an application program and accessing the data stored in said file, and a communication line which connects the server and the clients, said resume method comprising the steps of:

transferring to said server at a specific time information indicating a last operating state of a first client when operation of said client is stopped;

saving said information indicating a last operation state received from said first client in a storage device of said server;

requesting, by a second client, said server to transfer said information indicating a last operating state to said second client when said client is to resume operation;

transferring the saved information indicating a last operation state from the server to said second client in response to said request from said second client when said client is to resume operation; and resuming operation of said client at a last operation state indicated by said information indicating a last operation state transferred from said server when said client is to resume operation after operation of said client has been stopped.

43. A resume method according to claim 42, wherein said information indicating a last operating state of said first client includes contents of a main memory of said first client.

44. A resume method according to claim 42, wherein said information indicating a last operating state of said first client includes contents of a display memory of said first client.

45. A resume method according to claim 42, wherein said information indicating a last operating state of said first client includes a name of said first client.

46. A resume method according to claim 42, wherein said information indicating a last operating state of said first client also indicates a state of connection between said file of said server and said application program of said first client.

47. A resume method according to claim 46, wherein said state of connection between said file of said server and said application program of said first client includes a network name of said file to be opened in said server, a path name of said file to be opened, and a file identifier obtained as a result of opening said file.

48. A resume method according to claim 42, wherein said specific time is when an user turns on a switch for resuming at said first client.

49. A resume method according to claim 42, wherein said specific time is when a keyboard of said first client issues a resume command.

50. A resume method according to claim 42, wherein said specific time is before power of said first client is turned off, and said second client requests transfer of said information indicating a last operating state when power of said second client is turned on.

51. A resume method according to claim 42, wherein said first and second clients have a temporary storage region in a main memory for saving temporary accommodating information indicating changes in contents of said file before said file is closed by said application program of said clients, said information indicating a last operating state of said first client also includes said temporary accommodating information, and said second client causes said client to resume operation using contents of said temporary storage region.

52. A resume method according to claim 42, wherein said first client and said second client are constructed with a same architecture.

* * * * *